United States Patent
Nakagawa et al.

(10) Patent No.: US 11,238,387 B2
(45) Date of Patent: Feb. 1, 2022

(54) MANAGEMENT APPARATUS AND MANAGEMENT SYSTEM

(71) Applicant: NTT DOCOMO, INC., Tokyo (JP)

(72) Inventors: Hiroshi Nakagawa, Tokyo (JP); Kazuhiro Yamada, Tokyo (JP); Youhei Oono, Tokyo (JP); Yuichiro Segawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/756,509

(22) PCT Filed: Jan. 16, 2019

(86) PCT No.: PCT/JP2019/001000
§ 371 (c)(1),
(2) Date: Apr. 16, 2020

(87) PCT Pub. No.: WO2019/142798
PCT Pub. Date: Jul. 25, 2019

(65) Prior Publication Data
US 2020/0348970 A1    Nov. 5, 2020

(30) Foreign Application Priority Data
Jan. 19, 2018    (JP) .............................. JP2018-007355

(51) Int. Cl.
*G06Q 10/00* (2012.01)
*G06Q 10/06* (2012.01)
(Continued)

(52) U.S. Cl.
CPC ....... *G06Q 10/06316* (2013.01); *B64C 19/00* (2013.01); *G06F 9/4881* (2013.01);
(Continued)

(58) Field of Classification Search
CPC ....... G06Q 10/06316; G06Q 10/06312; G06Q 10/105; G06Q 10/1097; B64C 19/00
See application file for complete search history.

(56) References Cited

U.S. PATENT DOCUMENTS

| | | | |
|---|---|---|---|
| 2009/0199192 A1* | 8/2009 | Laithwaite | G06Q 10/06 718/104 |
| 2012/0215580 A1* | 8/2012 | Barney | G06Q 10/00 705/7.16 |

(Continued)

FOREIGN PATENT DOCUMENTS

JP    2016218809 A    12/2016

OTHER PUBLICATIONS

Kaddouh, B. Y., Crowther, W. J., & Hollingsworth, P. (2016). Dynamic resource allocation for efficient sharing of services from heterogeneous autonomous vehicles. Journal of Aerospace Information Systems, 13(12), 450-474. (Year: 2016).*

(Continued)

*Primary Examiner* — William S Brockington, III
(74) *Attorney, Agent, or Firm* — MKG, LLC

(57) ABSTRACT

A management system includes a storage unit that stores schedule information that indicates schedules of a plurality of tasks to be performed by the same flight vehicle. The schedule information includes types of the plurality of tasks, date/times of the plurality of tasks, and locations at which the plurality of tasks are to be performed. When the types, the date/times, and the locations that are included in the schedule information stored in the storage unit satisfy an integration condition, an integration unit integrates the schedules of the plurality of tasks. An output unit outputs integrated schedule information indicating the schedules of the integrated tasks.

18 Claims, 4 Drawing Sheets

(51) Int. Cl.
  *B64C 19/00* (2006.01)
  *G06F 9/48* (2006.01)
  *G06Q 10/10* (2012.01)
  *G06Q 50/02* (2012.01)
  *A01M 7/00* (2006.01)
  *B64C 39/02* (2006.01)
  *B64D 1/18* (2006.01)

(52) U.S. Cl.
  CPC ............ *G06Q 10/06312* (2013.01); *G06Q 10/063112* (2013.01); *G06Q 10/105* (2013.01); *G06Q 10/1097* (2013.01); *G06Q 50/02* (2013.01); *A01M 7/0042* (2013.01); *B64C 39/02* (2013.01); *B64C 2201/123* (2013.01); *B64D 1/18* (2013.01); *G06F 2209/486* (2013.01)

(56) References Cited

U.S. PATENT DOCUMENTS

2015/0170080 A1\* 6/2015 Kaushik ............... G06Q 10/04
  705/7.22
2015/0317582 A1\* 11/2015 Nath ............... G06Q 10/06311
  705/7.13

OTHER PUBLICATIONS

International Search Report issued in corresponding PCT Application No. PCT/JP2019/001000, dated Apr. 10, 2019, 2 pages.

\* cited by examiner

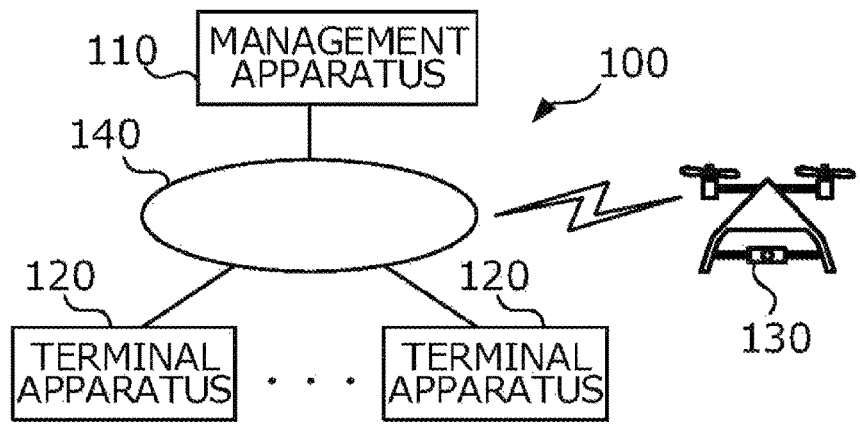
FIG. 1
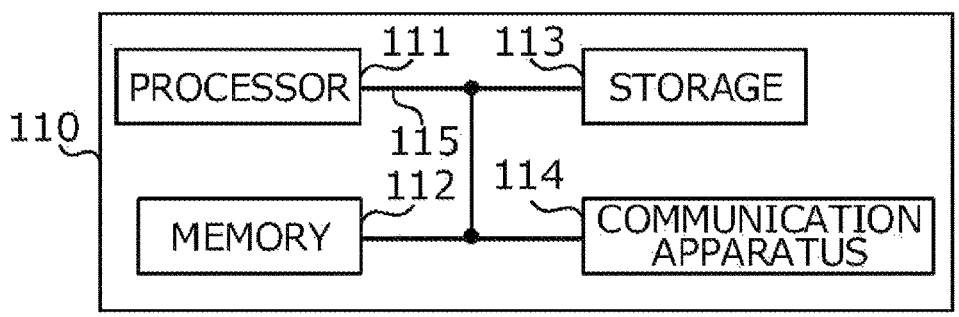
FIG. 2
| TASK ID | USER ID | TASK TYPE | TASK DATE/TIME | TASK LOCATION |
|---|---|---|---|---|
| W001 | U00A | AGRICULTURAL CHEMICAL SPRAYING | NOVEMBER 1 | FIELD a |
| W002 | U00B | AGRICULTURAL CHEMICAL SPRAYING | NOVEMBER 3 | FIELD b |
| ... | ... | ... | ... | ... |
FIG. 3

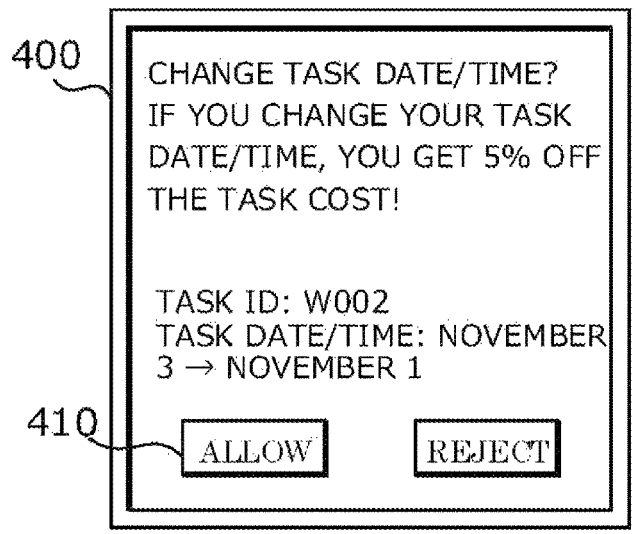
FIG. 9
| TASK ID | USER ID | TASK TYPE | TASK DATE/TIME | TASK LOCATION |
|---|---|---|---|---|
| W001 | U00A AND U00B | AGRICULTURAL CHEMICAL SPRAYING | NOVEMBER 1 | FIELDS a AND b |
| ... | ... | ... | ... | ... |
FIG. 10
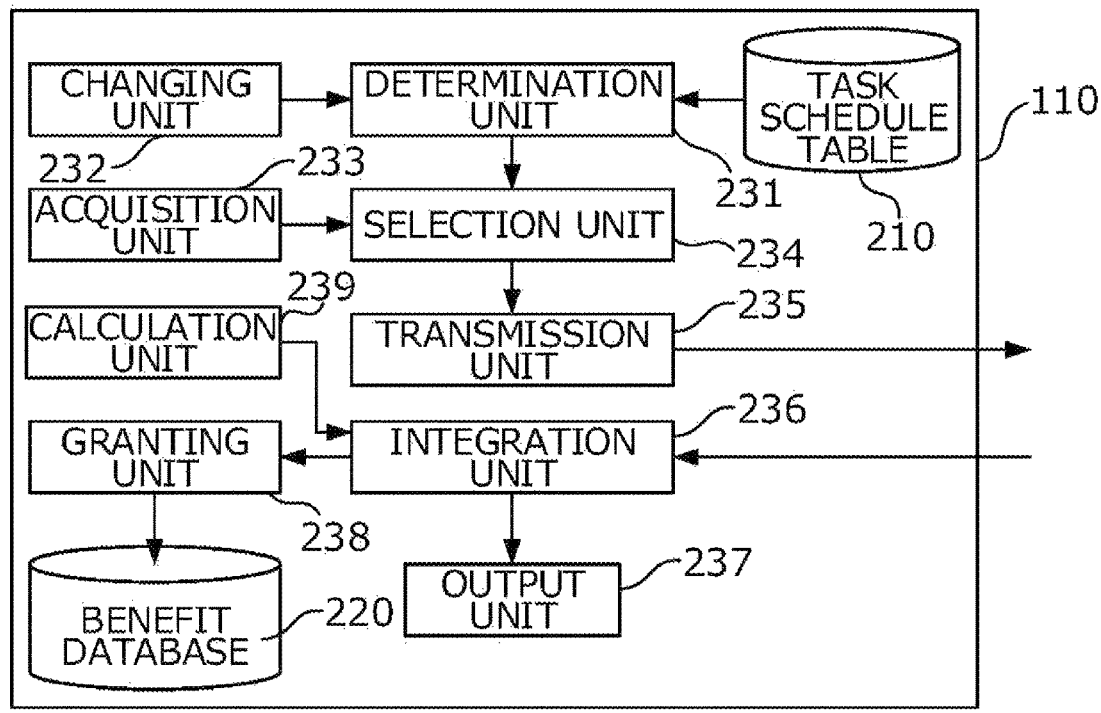
FIG. 11

MANAGEMENT APPARATUS AND MANAGEMENT SYSTEM

TECHNICAL FIELD

The present invention relates to a technique for assisting tasks performed using a flight vehicle.

BACKGROUND ART

In the field of agriculture, there is a technique for assisting shared use of a device that is used in tasks. For example, JP 2016-218809A describes an agricultural device share lease execution system in which an agricultural device, which is an item for lease, is leased out by a leasing company to one farmer who is a member of a share team composed of multiple farmers with a share lease contract. After the task performed by the farmer is finished, the agricultural device is transported to the next farmer, and the farmers are billed for the lease fee.

SUMMARY OF INVENTION

Various tasks relating to agriculture, such as agricultural chemical spraying and observation of the growth state of a crop are performed using unmanned flight vehicles such as drones in some cases. However, when this type of task is performed with drones that are owned by each farmer, the efficiency of the task is not good in some cases when viewed overall.

The present invention provides a management apparatus including: a storage unit configured to store schedule information that indicates schedules of a plurality of tasks to be performed by the same flight vehicle, the schedule information including types of the plurality of tasks, dates or times of the plurality of tasks, and locations at which the plurality of tasks are to be performed; an integration unit configured to, when the types, the dates or times, and the locations that are included in the schedule information stored in the storage unit satisfy an integration condition, integrate the schedules of the plurality of tasks; and an output unit configured to output integrated schedule information indicating the integrated schedules of the tasks.

The integration condition may be a condition that the types of the plurality of tasks are the same, a difference between the dates or times of the plurality of tasks falls within a predetermined time range, and a distance between the locations at which the plurality of tasks are to be performed falls within a predetermined distance range.

The management apparatus may further include a changing unit configured to change the predetermined time range or the predetermined distance range according to the types of the plurality of tasks.

The management apparatus may further include a transmission unit configured to, if the types, the dates or times, and the locations satisfy the integration condition, transmit information inquiring as to whether or not a schedule of at least one task of the plurality of tasks may be changed, to a terminal apparatus operated by a manager of the at least one task. When response information indicating that the schedule of the at least one task may be changed is input, the integration unit may integrate the schedules of the plurality of tasks.

The transmission unit may transmit, to the terminal apparatus, benefit information indicating a benefit granted when the schedule of the at least one task is changed, and the management apparatus may further include a granting unit configured to grant a benefit to the manager when the schedules of the plurality of tasks are integrated according to the input of the response information.

The plurality of tasks may include a plurality of related tasks that use the same function of the flight vehicle, the integration condition may include a first condition relating to the types, a second condition relating to the dates or times, and a third condition relating to the locations, and if the plurality of related tasks satisfy the first condition and the second condition but do not satisfy the third condition, the integration unit may change the date or time of at least one of the plurality of related tasks such that the plurality of related tasks are performed continuously.

The management apparatus may further include a calculation unit configured to calculate the total amount of time needed for the plurality of tasks. If the calculated total exceeds an amount of time that the flight vehicle can operate continuously, the integration unit need not integrate the schedules of the plurality of tasks.

The management apparatus may further include an acquisition unit configured to acquire weather information. The integration unit may change a schedule of at least one of the plurality of tasks based on the acquired weather information.

The storage unit may store operation proficiency levels of a plurality of operators who are to operate the flight vehicle in the plurality of tasks, and based on the proficiency levels stored in the storage unit, the integration unit may change an operator who is to operate the flight vehicle in at least one of the plurality of tasks.

Also, the present invention provides a management system including: a storage unit configured to store schedule information that indicates schedules of a plurality of tasks to be performed by the same flight vehicle, the schedule information including types of the plurality of tasks, dates or times of the plurality of tasks, and locations at which the plurality of tasks are to be performed; an integration unit configured to, when the types, the dates or times, and the locations that are included in the schedule information stored in the storage unit satisfy an integration condition, integrate the schedules of the plurality of tasks; and an output unit configured to output integrated schedule information indicating the integrated schedules of the tasks.

According to the present invention, the efficiency of tasks performed using a flight vehicle can be improved.

BRIEF DESCRIPTION OF DRAWINGS

FIG. 1 is a diagram showing an example of an overall configuration of management system 100 in accordance with the present invention.

FIG. 2 is a diagram showing an example of a hardware configuration of management apparatus 110 in accordance with the present invention.

FIG. 3 is a diagram showing an example of task schedule table 210 in accordance with the present invention.

FIG. 9 is a diagram showing an example of recommendation screen 400 in accordance with the present invention.

FIG. 10 is a diagram showing an example of integrated schedule information in accordance with the present invention.

FIG. 11 is a diagram showing an example of a functional configuration of management apparatus 110 according to a modification in accordance with the present invention.

DETAIL DESCRIPTION OF THE PREFERRED EMBODIMENTS

Figure 4:
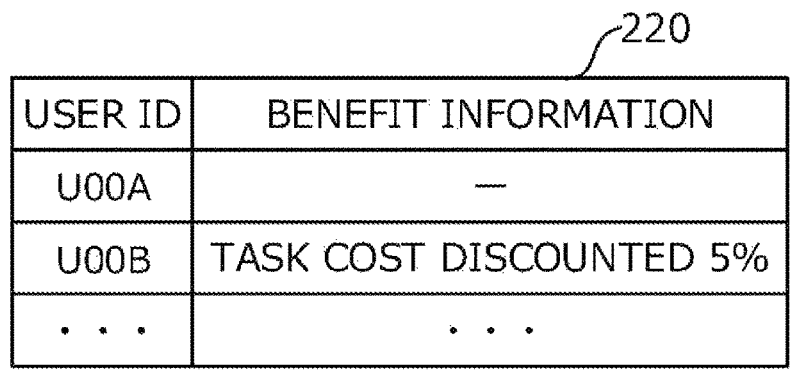
FIG. 4 is a diagram showing an example of benefit database 220 in accordance with the present invention.

FIG. 1 is a diagram showing an example of an overall configuration of management system 100. In management system 100, various tasks managed by multiple managers (hereinafter referred to as "task managers") are performed using the same flight vehicle 130. The tasks may be tasks relating to agriculture, such as agricultural chemical spraying, watering, observation of the growth state of a crop, or a countermeasure against vermin. Management system 100 assists the task managers in shared use of flight vehicle 130.

Management system 100 includes management apparatus 110, multiple terminal apparatuses 120, and flight vehicle 130. Note that the numbers of management apparatus 110, terminal apparatuses 120, and flight vehicle 130 are exemplary and there is no limitation thereto. Management apparatus 110 is connected to multiple terminal apparatuses 120 and flight vehicle 130 via communication line 140. Communication line 140 transmits data between these apparatuses. Communication line 140 may be constituted by including a moving body communication network and the Internet, for example.

FIG. 2 is a diagram showing an example of a hardware configuration of management apparatus 110. Management apparatus 110 manages a schedule of multiple tasks performed using flight vehicle 130. Management apparatus 110 may also be physically constituted as a computer apparatus including processor 111, memory 112, storage 113 (an example of a storage unit), communication apparatus 114, and the like. Note that in the following description, the term "apparatus" can be replaced with "circuit", "device", "unit", or the like.

Processor 111 activates, for example, an operating system to control the entire computer. Processor 111 may also be constituted by a central processing unit (CPU) that includes an interface with peripheral apparatuses, a control apparatus, an arithmetic apparatus, a register, and the like.

Furthermore, processor 111 reads a program (program code), a software module, or data onto memory 112 from storage 113 and/or communication apparatus 114, and executes various types of processing based thereon. As the program, a program for causing the computer to execute at least part of an operation of management apparatus 110 is used. The various types of processing that are executed in management apparatus 110 may be executed by one processor 111, or may be executed by two or more processors 111 at the same time or successively. One or more chips may also be mounted on processor 111. Note that the program may also be transmitted from a network via a telecommunication line.

Memory 112 is a computer-readable recording medium, and may also be constituted by, for example, at least one of a read only memory (ROM), an erasable programmable ROM (EPROM), an electrically erasable programmable ROM (EEPROM), and a random access memory (RAM). Memory 112 may also be referred to as a register, a cache, a main memory (main storage unit), or the like. Memory 112 can store a program (program code), a software module, and the like that can be executed to perform a flight control method according to an embodiment of the present invention.

Storage 113 is a computer-readable recording medium, and may also be constituted by, for example, at least one of an optical disk such as a compact disc ROM (CD-ROM), a hard disc drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disc, and a magnetic strip. Storage 113 may also be referred to as an auxiliary storage unit.

Communication apparatus 114 is hardware (a transmitting and receiving device) for performing communication with a computer via a wired network and/or a wireless network, and is also referred to as, for example, a network device, a network controller, a network card, a communication module, or the like.

Furthermore, the apparatuses such as processor 111 and memory 112 are connected to each other via bus 115 for communicating information. Bus 115 may be constituted by a single bus, or may be constituted by buses that are different from each other between the apparatuses.

FIG. 3 is a diagram showing an example of task schedule table 210 stored in storage 113. Schedule information indicating schedules of multiple tasks to be performed using flight vehicle 130 is stored in task schedule table 210. The schedule information may also be stored in response to operations performed by the operation managers, for example. In this example, task IDs, user IDs, task types, task date/times, and task locations are stored in association with each other in task schedule table 210. The task ID is information for identifying a task. The user ID is information for identifying a task manager. The task type indicates the type of the task. The task date/time indicates the scheduled date/time when the task is to be performed. Note that the task date/time need not include a time, and may also only include a date. The task location indicates a location at which the task is to be performed. Note that in the following description, the task identified by the task ID stored in task schedule table 210 also includes "a task registered in task schedule table 210".

FIG. 4 is a diagram showing an example of benefit database 220 stored in storage 113. In this example, a user ID and benefit information are stored in association with each other in benefit database 220. The user ID is information for identifying a task manager. The benefit information indicates benefit that is given to the task manager.

Figure 5:
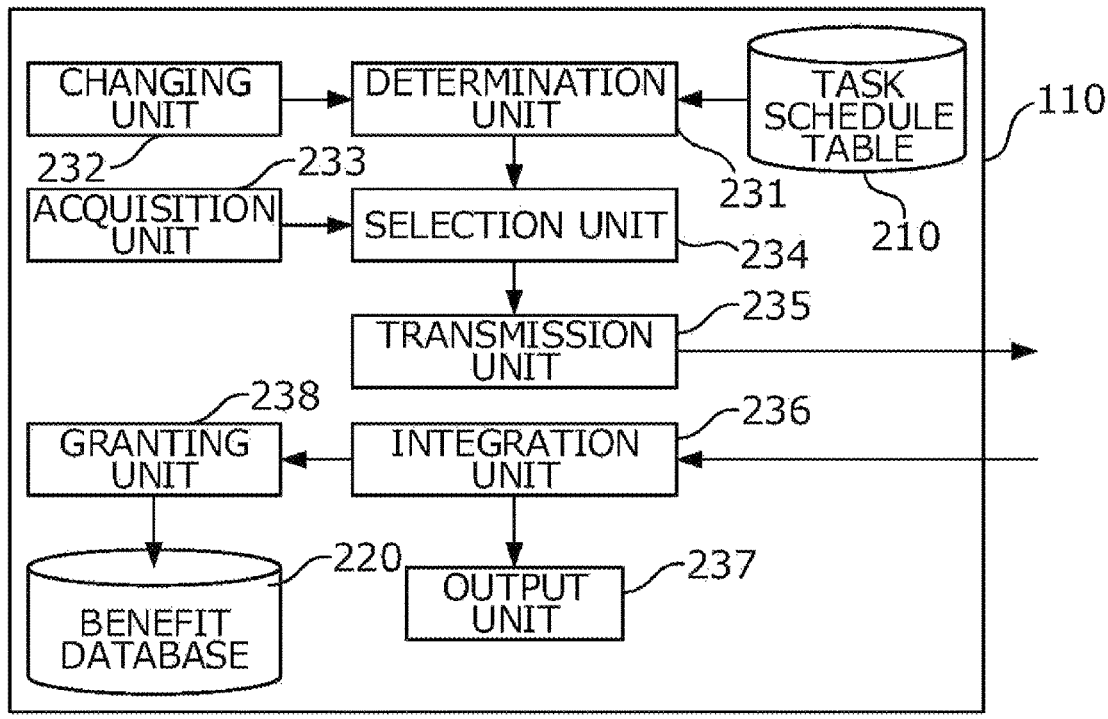
FIG. 5 is a diagram showing an example of a functional configuration of management apparatus 110 in accordance with the present invention.

FIG. 5 is a diagram showing an example of a functional configuration of management apparatus 110. Management apparatus 110 includes determination unit 231, changing unit 232, acquisition unit 233, selection unit 234, transmission unit 235, integration unit 236, output unit 237, and granting unit 238. These functions may also be realized by, for example, loading predetermined software (a program) to hardware such as processor 111 and memory 112, whereby processor 111 performs computation and controls communication performed by communication apparatus 114 and readout and/or writing of data in memory 112 and storage 113.

Determination unit 231 determines whether or not the schedules of multiple tasks registered in task schedule table 210 satisfy an integration condition. This integration condition is a condition for determining multiple tasks that are thought to improve task efficiency when performed together. The integration condition may also include, for example, a condition relating to the task type, a condition relating to the task date/time, and a condition relating to the task location. For example, the integration condition may be that the task types are the same for the multiple tasks, the difference between the task date/times is within a predetermined time range, and the distance between the task locations is within a predetermined distance range. The predetermined time range is set in advance to, for example, a range of date/times that are thought to have little influence on the tasks even if a task date/time is changed within that range. The predetermined distance range is set in advance to, for example, a range of distances in which the tasks can be efficiently performed together.

Changing unit 232 changes at least one of the predetermined time range and the predetermined distance range included in the integration condition in response to the task type. For example, regarding agricultural chemical spraying, although changing the task date/time somewhat is not a significant problem for the task, if the task locations are far apart from each other, the agricultural chemicals cannot be sprayed continuously, and therefore the efficiency of the task will decrease. Accordingly, if the task type of the task is agricultural chemical spraying, the predetermined time range may also be changed such that it is wider, and the predetermined distance range may also be changed such that it is narrower. On the other hand, regarding observation of the growth state of a crop, if the task date/time is changed significantly, it will no longer be possible to accurately keep track of the growth state. However, even if the task locations are far apart from each other, there will not be a significant influence on the task efficiency. Accordingly, when the task type of the task is observation of the growth state of a crop, the predetermined time range may also be changed to be narrower, and the predetermined distance range may also be changed to be wider.

Acquisition unit 233 acquires weather information from an external spraying apparatus (not shown) that sprays weather information. The weather information may also include, for example, information that indicates the weather for the task location on the task date/time. The weather information may also be acquired periodically, for example.

Selection unit 234 selects tasks that are candidates for schedule change among the multiple tasks that satisfy the integration condition. This selection may also be performed based on the weather information acquired by acquisition unit 233, for example.

If determination unit 231 determines that the integration condition is satisfied, transmission unit 235 transmits information for inquiring as to whether or not the schedule of the task may be changed to terminal apparatus 120, which is used by the task manager of the task selected by selection unit 234.

If determination unit 231 determines that the integration condition is satisfied, upon receiving input of response information indicating that the schedule of the task may be changed from terminal apparatus 120, integration unit 236 integrates the schedules of the multiple tasks that satisfy the integration condition. This integration refers to integrating two or more tasks into one task. The input may also include, for example, receiving information from terminal apparatus 120.

Output unit 237 outputs integrated schedule information indicating the schedules of the integrated tasks. For example, output may also include transmission of information to terminal apparatus 120 or flight vehicle 130. Push-type or pull-type transmission may be performed. In another example, if an output apparatus is connected to management apparatus 110, the integration schedule information may also be output from the output apparatus.

When the schedules of multiple tasks are integrated, granting unit 238 grants a benefit to the task manager who changed the schedule of the task, using benefit database 220. A benefit refers to something that is advantageous for the task manager. For example, a benefit may be a price reduction or addition of points.

Figure 6:
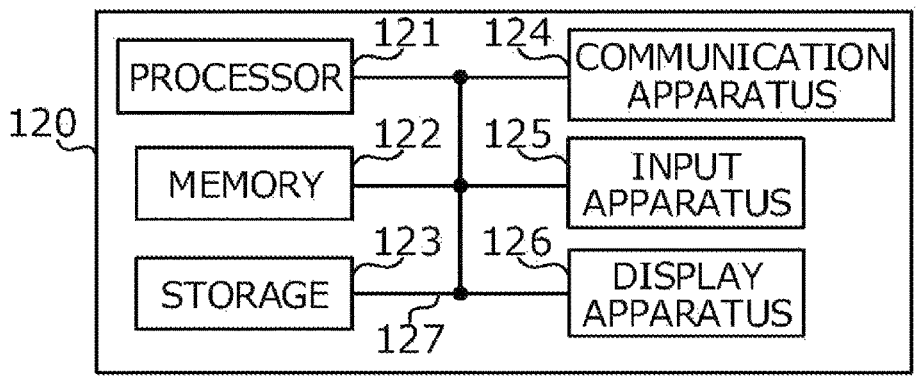
FIG. 6 is a diagram showing an example of a hardware configuration of terminal apparatus 120 in accordance with the present invention.

FIG. 6 is a diagram showing an example of a hardware configuration of terminal apparatus 120. Terminal apparatuses 120 are used by the task managers and exchange data with management apparatus 110. Terminal apparatus 120 may also be, for example, a smartphone, a tablet terminal, or a personal computer. Terminal apparatus 120 may also be physically constituted as a computer apparatus including processor 121, memory 122, storage 123, communication apparatus 124, input apparatus 125, display apparatus 126, and the like. Also, apparatuses such as processor 121 and memory 122 are connected by bus 127 for communicating information. Since processor 121, memory 122, storage 123, communication apparatus 124, and bus 127 are similar to processor 111, memory 112, storage 113, communication apparatus 114, and bus 115, which are included in management apparatus 110, description thereof is omitted. Input apparatus 125 is used for input of various types of information. For example, input apparatus 125 may also be constituted by including a keyboard, a mouse, physical buttons, or a touch sensor. Display apparatus 126 displays various types of information. For example, display apparatus 126 may also be constituted by including a liquid crystal display.

Figure 7:
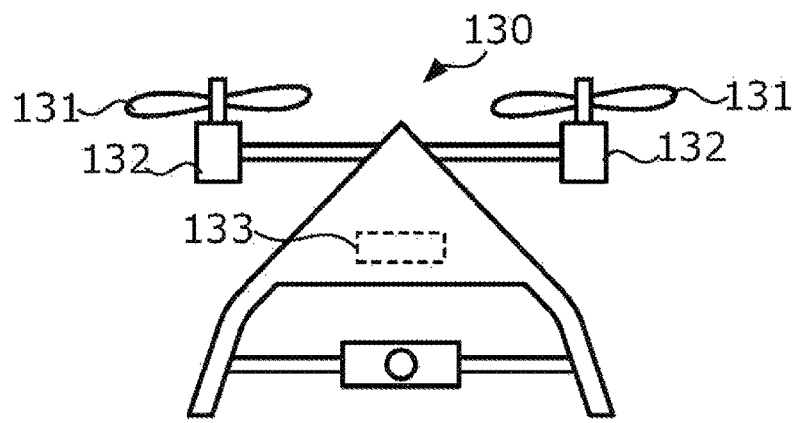
FIG. 7 is a diagram showing an example of a hardware configuration of flight vehicle 130 in accordance with the present invention.

FIG. 7 is a diagram showing an example of a hardware configuration of flight vehicle 130. Flight vehicle 130 is an unmanned aircraft that can fly autonomously without being operated by a person, and is, for example, a drone. In addition to a configuration similar to that of management apparatus 110, flight vehicle 130 physically includes propellers 131, driving apparatuses 132, and battery 133. Propellers 131 rotate about shafts. Due to propellers 131 rotating, flight vehicle 130 flies. Driving apparatuses 132 cause rotation by applying motive force to propellers 131. Driving apparatuses 132 are, for example, motors. Driving apparatuses 132 may also be directly connected to propellers 131, or may also be connected to propellers 131 via transmission mechanisms that transmit the motive force of driving apparatuses 132 to propellers 131. Battery 133 supplies electric power to the units of flight vehicle 130 including driving apparatuses 132. An additional apparatus corresponding to the task may also be attached to flight vehicle 130. For example, if flight vehicle 130 is to be used for agricultural chemical spraying, a spraying mechanism for spraying the agricultural chemical may also be attached to flight vehicle 130. If flight vehicle 130 is to be used for observation of the growth state of a crop, an image capture apparatus such as a digital camera for capturing an image may also be attached to flight vehicle 130.

Figure 8:
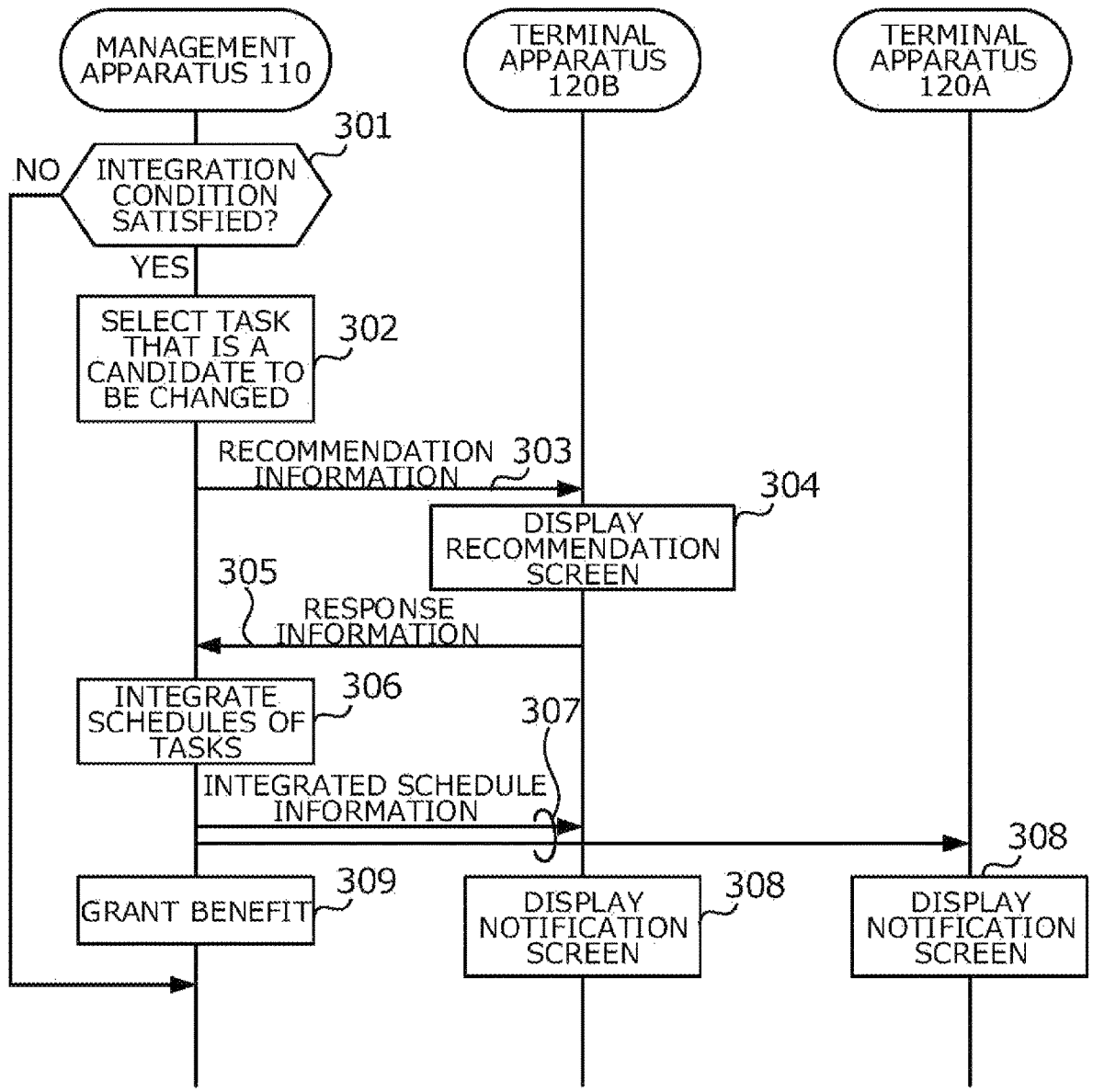
FIG. 8 is a sequence chart showing an example of operations of management system 100 in accordance with the present invention.

FIG. 8 is a sequence chart showing an example of operations of management system 100. This operation is started at a predetermined timing. The predetermined timing may also be, for example, a time at which task schedule table 210 is updated, or may also be a predetermined time interval. Here, it is assumed that multiple terminal apparatuses 120 include terminal apparatus 120A that is used by task manager A, and terminal apparatus 120B that is used by task manager B. Note that in the following description, the configurations of terminal apparatuses 120A and 120B will be described with "A" and "B" respectively added to the ends of reference numerals.

In step 301, determination unit 231 determines whether or not there are two or more tasks that satisfy the integration condition among the multiple tasks registered in task schedule table 210. For example, the task with the task ID "W001" and the task with the task ID "W002" shown in FIG. 3 both have agricultural chemical spraying as their task type. If two days, which is the difference between the task date/times of the tasks, that is, the difference between November 1 and November 3, is within the time range, and the distance between the task locations of the tasks, that is, the distance between field a and field b, is within a predetermined distance range, it is determined that the integration condition is satisfied. Note that since the task type of the task with the task ID "W001" and the task with the task ID "W002" is agricultural chemical spraying, the predetermined time range may be changed in advance by changing unit 232 so as to be wider than a reference time range, and the predetermined distance range may be changed so as to be narrower than a reference distance range. If it is determined in step 301 that there are tasks that satisfy the integration condition (YES in step 301), the processing advances to step 302. On the other hand, if it is determined in step 301 that no task satisfies the integration condition (NO in step 301), the operation ends.

If it is determined in step 301 that the task with task ID "W001" and the task with task ID "W002" satisfy the integration condition, in step 302, selection unit 234 selects the task that is a candidate for schedule change among the tasks, based on weather information acquired by acquisition unit 233. Here, a case is envisioned in which the weather forecast of November 1, which is the task date/time of the task with task ID "W001" shown in FIG. 3, is clear, and the weather forecast of November 3, which is the task date/time of the task with task ID "W002", is rainy. For example, if the weather that is suitable for agricultural chemical spraying is clear, it is preferable to perform agricultural chemical spraying on November 1, when the weather forecast is clear. Accordingly, in this case, the task with task ID "W002", which is to be performed on November 3, is selected as a candidate for schedule change.

When the task with task ID "W002" is selected in step 302, in step 303, transmission unit 235 transmits recommendation information recommending a change of the schedule of the task to terminal apparatus 120B, which is used by task manager B of the task. In this case, the recommendation information includes information inquiring as to whether or not the task date/time of the task with task ID "W002" may be changed from November 3 to November 1. The recommendation information also includes benefit information indicating that if the task date/time is changed, the task cost will be discounted 5%, for example.

In step 304, when the recommendation information is received by terminal apparatus 120B, recommendation screen 400 is displayed on display apparatus 126B based on the recommendation information.

FIG. 9 is a diagram showing an example of recommendation screen 400. In this example, recommendation screen 400 includes information inquiring as to whether or not the task date/time may be changed, and benefit information indicating that the task cost will be discounted 5%. Recommendation screen 400 also includes allow button 410 that is used for an operation of allowing the change of the task date/time. If the task date/time is to be changed, task manager B presses allow button 410 using input apparatus 125B.

In step 305, when allow button 410 is pressed using terminal apparatus 120B, response information indicating that the task date/time is to be changed is transmitted from terminal apparatus 120B to management apparatus 110.

In step 306, when the response information is received by management apparatus 110, the task with task ID "W001" and the task with task ID "W002" are integrated by integration unit 236. At this time, the schedule of the task with task ID "W002" is changed by integration unit 236. Also, integration schedule information indicating the schedules of the integrated tasks is generated by integration unit 236.

FIG. 10 is a diagram showing an example of integration schedule information. The integration schedule information indicates that the task with task ID "W002" shown in FIG. 3 is integrated with the task with task ID "W00", and that agricultural chemical spraying is to be performed in field a and field b on November 1. Note that in this case, the record including task ID "W002" shown in FIG. 3 may also be erased.

When the integrated schedule information shown in FIG. 10 is generated in step 307, output unit 237 transmits the integrated schedule information to terminal apparatuses 120A and 120B that are used by task managers A and B.

In step 308, when notification information is received by terminal apparatuses 120A and 120B, notification screens for performing notification that the schedules have been integrated are displayed on display apparatuses 126A and 116B based on the notification information. The notification screen includes information indicating that, for example, the task with task ID "W001" and the task with task ID "W002" are integrated and the agricultural chemical spraying is to be performed in field a and field b on November 1.

In step 309, granting unit 238 grants a benefit to task manager B whose task schedule was changed due to the integration in step 306. For example, in benefit database 220 shown in FIG. 4, benefit information indicating that the task cost is to be discounted 5% is stored in association with user ID "U00B", which identifies task manager B. In this case, the task cost billed to task manager B is discounted 5%.

If the schedules of multiple tasks are integrated in this manner, the flight plan of flight vehicle 130 may be generated based on the integrated schedule information generated in step 306 and the generated flight plan may be transmitted to flight object 130. The flight plan is information indicating the plan of the flight of flight vehicle 130. For example, a flight plan for performing agricultural chemical spraying in field a and field b on November 1 may be generated by management apparatus 110 based on, for example, the integrated schedule information shown in FIG. 10, and the generated flight plan may be transmitted from management apparatus 110 to flight vehicle 130. In this case, flight vehicle 130 may also perform the tasks while flying according to the flight plan received from management apparatus 110.

According to the above-described embodiment, multiple tasks that satisfy the integration condition are performed together, and therefore the efficiency of the tasks can be improved compared to the case where the tasks are performed separately. Also, since at least one of the predetermined time range and the predetermined distance range included in the integration condition is changed according to the task type, the schedules of the tasks can be integrated in conditions that are suitable for the task type. Furthermore, since the task manager is asked whether or not to change the schedule of the task, it is possible to prevent the schedule of a task from being integrated without permission from the task manager. Furthermore, since a benefit is granted to a task manager whose schedule is changed, it is possible to increase motivation to change the schedule of a task. Furthermore, since the task date/times are changed based on weather conditions when the schedules of multiple tasks are integrated, it is possible to perform tasks in weather that is suitable for the tasks.

The present invention is not limited to the above-described embodiment. The above-described embodiment may also be modified as follows. Also, two or more of the following modifications may be carried out in combination with each other.

In the above-described embodiment, if flight vehicle 130 has a function corresponding to a task, multiple related tasks that use the same function may be carried out continuously. This function may be hardware or software of flight vehicle 130. For example, if flight vehicle 130 is used for agricultural chemical spraying, a spraying apparatus is attached to flight vehicle 130. In this case, the spraying apparatus may also be used in a function corresponding to agricultural chemical spraying.

In this case, even if the multiple related tasks do not satisfy the integration condition, if the multiple related tasks satisfy a continuation condition, integration unit 236 may change the schedule of at least one of multiple continuous tasks such that the related tasks are performed continuously. The continuation condition is a condition for determining multiple tasks that cannot be grouped together into one task but would be convenient to perform continuously. For example, the continuation condition may be a condition that the task types are the same among the multiple tasks, the differences in task date/times fall within a predetermined time range, and the distances of the task locations are outside of a predetermined distance range. In other words, if the multiple tasks satisfy a first condition relating to task types and a second condition relating to task date/times, which are included in the integration condition, but do not satisfy a third condition relating to task locations, the multiple tasks may also be determined as satisfying a continuation condition.

For example, for the task with task ID "W001" and the task with task ID "W002" shown in FIG. 3, if the differences between the task date/times are within the predetermined time range but the distances of the task locations are outside of the predetermined distance range, these tasks are not integrated. However, if these tasks are performed continuously, such as in the morning and in the afternoon, a task that is needed for preparing for the next task, such as cleaning of the spraying apparatus, does not need to be performed between these tasks, and therefore the burden on the task manager is reduced. Accordingly, the schedule of at least one task may also be changed such that the tasks are performed continuously. According to this modification, it is possible to perform multiple related tasks without changing the function of flight vehicle 130.

Note that if the schedules of multiple tasks are to be integrated, the task managers of the tasks and the operators of flight vehicle 130 are also integrated, whereas if the multiple related tasks are to be performed continuously, the task managers of the related tasks and the operators of flight vehicle 130 may be kept separate.

In the above-described embodiment, if the total task time for the multiple tasks that satisfy the integration condition exceeds the amount of time that flight vehicle 130 can continuously operate, the schedules of the multiple tasks need not be integrated.

FIG. 11 is a diagram showing an example of a functional configuration of management apparatus 110 according to a modification. Management apparatus 110 includes calculation unit 239 in addition to the functions shown in FIG. 5. Calculation unit 239 calculates the total amount of time needed for the multiple tasks that satisfy the integration condition. The task time may be calculated based on at least one of, for example, the surface area of the task location, the inclination of the task location, the weather of the task location on the task date/time, the task time needed to perform the same task in the past, and the proficiency level of the operator of flight vehicle 130. If the task time is to be calculated based on the surface area of the task location, the task time may be longer the greater the surface area of the task location is. When the task time is to be calculated based on the inclination of the task location, if there is an inclination at the task location, the task time may increase in length. This is because the task time tends to increase since it is difficult for an operator to get a sense of perspective on inclined land. When the task time is to be calculated based on the weather of the task location on the task date/time, if the weather condition is bad, the task time may increase in length. This is because if the weather condition is bad, such a case where the wind velocity is great or a case where it is raining, the task time tends to increase in length. If the task time is to be calculated based on a task time needed for the same task in the past, a task time similar to the task time needed for the same task in the past may also be calculated. This is because it is thought that if the same task was performed in the past, the next instance of the task will take an amount of time similar to the task time needed for the task performed in the past. If the task time is to be calculated based on the proficiency level of the operator, the task time may be shortened the higher the proficiency level of the operator is.

The amount of time that flight vehicle 130 can continuously operate may also be obtained based on the capacity of battery 133, for example. For example, if the capacity of battery 133 is a capacity according to which continuous operation is possible for 12 hours, the amount of time that flight vehicle 130 can continuously operate may be 12 hours. In another example, the amount of time that flight vehicle 130 can continuously operate may also be obtained according to the task type. For example, if the task time that is suitable for agricultural chemical spraying is from 6:00 AM to 6:00 PM, the amount of time that flight vehicle 130 can continuously operate may be 12 hours. On the other hand, if the task time that is suitable for observation of the growth state of a crop is from 8:00 AM to 3:00 PM, the amount of time that flight vehicle 130 can continuously operate may be 7 hours.

For example, if the amount of time that flight vehicle 130 can continuously operate is 12 hours, integration unit 236 need not integrate the schedules of multiple tasks that satisfy the integration condition if the total task time calculated for the tasks exceeds 12 hours. For example, if the task time of the task with task ID "W001" shown in FIG. 3 is 10 hours and the task time of the task with task ID "W002" is 5 hours, the total task time will be 15 hours. In this case, the total task time of the tasks exceeds 12 hours, which is the amount of time that flight vehicle 130 can continuously operate, and therefore the tasks are not integrated even if the tasks satisfy the integration condition. According to this modification, it is possible to prevent the schedules of multiple tasks from being integrated if the tasks will not be completed within the amount of time that flight vehicle 130 can continuously operate.

In the above-described embodiment, operator IDs may also be stored in association with the task IDs in task schedule table 210. An operator ID is information for identifying an operator of flight vehicle 130. Also, in this case, the operation proficiency levels of the operators may also be stored in storage 113. The proficiency level is a value indicating the operation level of flight vehicle 130, and for example, may be calculated based on the operation history of the operator. Changing unit 232 may also select the tasks that are candidates for schedule change, based on the proficiency levels stored in storage 113. Here, a case is envisioned where operator X is scheduled to operate flight vehicle 130 for the task with task ID "W001" shown in FIG. 3, and operator Y is scheduled to operate flight vehicle 130 for the task with task ID "W002". In this case, when the proficiency level of operator X is higher than the proficiency level of operator Y, it is preferable that operator X operates flight vehicle 130. Accordingly, in this case, the task with task ID "W002" may be selected as the candidate for schedule change. Also, upon receiving response information indicating that the schedule of a task is to be changed from terminal apparatus 120B, integration unit 236 may change operator Y of flight vehicle 130 for the task with task ID "W002" to operator X. Also, in this case, the benefit granted to task manager B may be that operator X, who has a high proficiency level, will operate flight vehicle 130. According to this modification, an operator with a proficiency level that is suitable for the task can operate flight vehicle 130 to perform the task.

In the above-described embodiment, management apparatus 110 may also receive a designation of an operator of flight vehicle 130 from the task manager. Designation of the operator may also be performed based on, for example, an operation performed using input apparatus 125 of terminal apparatus 120. In this case, schedule information indicating the operation schedules of the operators may also be stored in storage 113. Changing unit 232 may also select the task that is a candidate for task date/time change, based on the schedule information of the operators. For example, a case is envisioned in which task manager A and task manager B have designed operator X for the task with task ID "W001" shown in FIG. 3 and the task with task ID "W002". In this case, when the schedule of operator X, which indicates the schedule information stored in storage 113, is open on November 1 and is filled on November 3, operator X cannot operate flight vehicle 130 on November 3. In this case, the task with task ID "W002" may also be selected as a candidate for task date/time change. Also, integration unit 236 may set operator X as the operator of flight vehicle 130 for integrated tasks.

In the above-described embodiment, even if chemicals used in agricultural chemical spraying have similar effects, they may differ depending on the task manager. In this case, integration unit 236 may also integrate the chemicals used in the multiple tasks that satisfy the integration condition. Here, a case is envisioned in which a first chemical is used in the task with task ID "W001" shown in FIG. 3, and a second chemical is used in the task with task ID "W002". In this case, for example, the recommendation information transmitted to terminal apparatus 120B may also include information inquiring as to whether or not the chemical used in the task with task ID "W002" may be changed from the second chemical to the first chemical. Also, the benefit information included in the recommendation information may also indicate a benefit with a higher value compared to normal benefit information, that is, benefit information included in the recommendation information that does not include information inquiring as to whether or not the chemical may be changed. For example, if the normal benefit information indicates that the task cost will be discounted 5%, the benefit information may indicate that the task cost will be discounted 7%.

In the above-described embodiment, even if the integration condition is satisfied, the schedules of the tasks may not be integrated depending on the task type. For example, if the task type is agricultural chemical spraying, the schedules of the multiple tasks that satisfy the integration condition are integrated, whereas if the task type is observation of the growth state of a crop, the schedules of the multiple tasks may not be integrated even if the integration condition is satisfied.

In the above-described embodiment, at least some of the functions of management apparatus 110 may be included in terminal apparatus 120, flight vehicle 130, or another apparatus. Also, management apparatus 110 need not include all of the functions described in the embodiment.

The present invention may also be provided as a method including steps of processing performed by management system 100, management apparatus 110, terminal apparatus 120, or flight vehicle 130. The present invention may also be provided as a program that is executed in management system 100, management apparatus 110, terminal apparatus 120, or flight vehicle 130.

The block diagram of FIG. 5 shows blocks per functional units. These functional blocks (configuration units) are realized by an arbitrary combination of hardware and/or software. Furthermore, means for realizing the functional blocks is not particularly limited. In other words, the functional blocks may also be realized by one physically and/or logically coupled apparatus, or a plurality of apparatuses obtained by directly and/or indirectly (for example, in a wired and/or wireless manner) connecting two or more apparatuses that are physically and/or logically separated.

The hardware configurations of management apparatus 110, terminal apparatus 120, and flight vehicle 130 may also be configured to include one or more of the apparatuses shown in FIGS. 2, 6, and 7, or may be configured without including some of the apparatuses. Also, management apparatus 110, terminal apparatus 120, and flight vehicle 130 may be configured by including hardware such as a microprocessor, a digital signal processor (DSP), an ASIC (Application-Specific Integrated Circuit), a PLD (Programmable Logic Device), and an FPGA (Field Programmable Gate Array), and some or all of the functional blocks of management apparatus 110, terminal apparatus 120, and flight vehicle 130 may be realized using this hardware. For example, processors 111 and 121 may also be mounted in at least one of these pieces of hardware.

Notification of information is not limited to the aspects/embodiments explained in the present description, and may also be performed by another method. For example, notification of information may also be performed by physical layer signaling (for example, downlink control information (DCI) or uplink control information (UCI)), higher-level layer signaling (for example, radio resource control (RRC) signaling, medium access control (MAC) signaling, broadcast information (master information block (MIB) or system information block (SIB))), and other signals, or a combination thereof. Furthermore, RRC signaling may also be referred to as an RRC message, and may also be, for example, an RRC Connection Setup message, an RRC Connection Reconfiguration) message, or the like.

The aspects/embodiments explained in the present description may also be applied to a system using Long Term Evolution (LTE), LTE-Advanced (LTE-A), SUPER3G, IMT-Advanced, 4G, 5G, Future Radio Access (FRA), W-CDMA (registered trademark), GSM (registered trademark), CDMA2000, Ultra Mobile Broadband (UMB), IEEE802.11 (Wi-Fi), IEEE802.16 (WiMAX), IEEE802.20, Ultra-Wide Band (UWB), Bluetooth (registered trademark) or another appropriate system, and/or a next-generation system expanded based on them.

The orders of the processing procedure, sequence, flow-chart, and the like of the aspects/embodiments described in the present description may be changed unless they contradict each other. For example, the methods explained in the present description show various step elements in an exemplified order, and are not limited to the shown specific order.

Information and the like may be output from a higher-level layer (or a lower-level layer) to a lower-level layer (or a higher-level layer). Information and the like may also be input/output via a plurality of network nodes.

Input/output information and the like may also be stored in a specific location (for example, a memory), or may also be managed in a management table. Information and the like to be input/output may be overwritten, updated, or added. Output information and the like may also be deleted. Input information and the like may also be transmitted to another apparatus.

Judging may also be conducted using a value expressed by a single bit (0 or 1) or a truth-value (Boolean: true or false), or by comparing numerical values (for example, comparing a value with a predetermined value).

The aspects/embodiments explained in the present description may also be used alone or in combination, or may also be switched when they are implemented. Furthermore, notification of predetermined information (for example, notification of "being X") is not limited to being performed explicitly, and may also be performed implicitly (for example, notification of the predetermined information is not performed).

Software should be broadly interpreted to mean an instruction, an instruction set, a code, a code segment, a program code, a program, a sub program, a software module, an application, a software application, a software package, a routine, a subroutine, an object, an executable file, an execution thread, a procedure, a function and the like, regardless of whether it is referred to as software, firmware, middleware, a microcode, a hardware description language, or another name.

Furthermore, software, an instruction, and the like may also be transmitted/received via a transmission medium. For example, if software is transmitted from a web site, a server, or another remote source, using a wired technology such as a coaxial cable, an optical fiber cable, a twist pair, and a digital subscriber line (DSL), and/or a wireless technology such as infrared light, a radio wave, and a microwave, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned over the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

The terms "system" and "network" used in the present description can be used in an interchangeable manner.

Furthermore, the information and the parameters explained in the present description may also be expressed by absolute values, relative values from a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are in no way limiting.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The term "based on" used in the present description does not mean "based on only", unless otherwise noted. In other words, the term "based on" means both terms "based on only" and "based on at least".

Any reference to the elements using designations such as "first" and "second" used in the present description does not limit, in general, the amount or order thereof. These nominal signs can be used in the present description as a convenient method for distinguishing between two or more elements. Accordingly, reference to first and second elements does not mean that only two elements can be used here, or that the first element should precede the second element somehow.

The terms "including", "comprising", and any form thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

In the above-described embodiment, for example, if the task type is agricultural chemical spraying, the integration condition may also include the type of agricultural chemical that is to be used in agricultural chemical spraying. For example, when the type of agricultural chemical that is to be used in agricultural chemical spraying is the same, the schedules of the multiple tasks may also be integrated. In this case, the type of the agricultural chemical may also be stored in task schedule table 210 shown in FIG. 3. If the types of the agricultural chemicals that are to be used in the multiple tasks are different, when the tasks are integrated, a preparation task of washing the spraying apparatus and changing the agricultural chemical will occur in the middle of the task. According to this modification, only tasks with the same type of agricultural chemical will be integrated, and therefore this kind of preparation task does not occur during the integrated tasks. As a result, the burden on the task manager is reduced.

REFERENCE SIGNS LIST

100 Management system
110 Management apparatus
120 Terminal apparatus
130 Flight vehicle
231 Determination unit
232 Changing unit
233 Acquisition unit
234 Selection unit
235 Transmission unit
236 Integration unit
237 Output unit
238 Granting unit
239 Calculation unit

What is claimed is:

1. A management apparatus comprising:
a storage configured to store schedule information that indicates a plurality of schedules, each schedule associated with a respective task to be performed by a same flight vehicle, each schedule including a type of task, and a location and at least one of a date and a time that the respective task is to be performed; and
a processor configured to:
integrate two or more scheduled tasks into one integrated task having one schedule stored in the storage when the type, the at least one of the date and the time, and the location that are included in the schedule information stored in the storage of each of the two or more scheduled tasks of the one integrated task satisfy an integration condition indicative of improved efficiency of operation of the same flight vehicle when the two or more scheduled tasks are combined into the one integrated task; and
transmit the schedule information of the one integrated task to control the operation of the same flight vehicle; and
wherein the two or more scheduled tasks include a plurality of related tasks that use a same function of the same flight vehicle, and
wherein the integration condition includes a first condition relating to the type, a second condition relating to the at least one of the date and the time, and a third condition relating to the location, and
if the plurality of related tasks satisfy the first condition and the second condition but do not satisfy the third condition, the processor is configured to change the at least one of the date and the time of at least one of the plurality of related tasks such that the plurality of related tasks are performed continuously.

2. The management apparatus according to claim 1, wherein
the integration condition is a condition that the type of the two or more scheduled tasks are the same, a difference between the at least one of the date and the time of the two or more scheduled tasks falls within a predetermined time range, and a distance between the location at which the two or more scheduled tasks are to be performed falls within a predetermined distance range.

3. The management apparatus according to claim 2, wherein the processor is further configured to:
change the predetermined time range or the predetermined distance range according to the type of the two or more scheduled tasks of the one integrated task.

4. The management apparatus according to claim 1, wherein the processor is further configured to:
if the type, the at least one of the date and the time, and the location satisfy the integration condition, transmit information inquiring as to whether or not a schedule of at least one task of the two or more scheduled tasks may be changed, to a terminal apparatus operated by a manager of the at least one task, and
when response information indicating that the schedule of the at least one task may be changed is input, integrate each schedule of the two or more scheduled tasks.

5. The management apparatus according to claim 4, wherein the processor is configured to:
transmit, to the terminal apparatus, benefit information indicating a benefit to be granted when each schedule of the at least one task is changed, and
when each schedule of the two or more scheduled tasks is integrated according to the input of the response information, grant the benefit to the manager.

6. The management apparatus according to claim 1, wherein the processor is further configured to:
calculate a total amount of time needed for the two or more scheduled tasks,
wherein if the calculated total exceeds an amount of time that the same flight vehicle can operate continuously, each schedule of the two or more scheduled tasks is not integrated.

7. The management apparatus according to claim 1, wherein the processor is further configured to:
acquire weather information; and
change a schedule of at least one of the two or more scheduled tasks based on the acquired weather information.

8. The management apparatus according to claim 1, wherein
the storage stores proficiency levels of a plurality of operators who are to operate the same flight vehicle in the two or more scheduled tasks, and
based on the proficiency levels stored in the storage, the processor is further configured to change an operator who is to operate the same flight vehicle in at least one of the two or more scheduled tasks.

9. The management apparatus according to claim 1, wherein the processor is further configured to change the at least one of the date and the time of one of the two or more scheduled tasks to the at least one of the date and the time of one of a second of the two or more scheduled tasks.

10. The management apparatus according to claim 1, wherein each of the two or more scheduled tasks relate to agriculture.

11. A management system comprising:
a same flight vehicle to perform a plurality of tasks according to schedule information; and
a management apparatus comprising:
a storage configured to store the schedule information that indicates a plurality of schedules, each schedule associated with a respective task to be performed by the same flight vehicle, each schedule including a type of task, and a location and at least one of a date and a time that the respective task is to be performed; and
a processor configured to:
integrate two or more scheduled tasks into one integrated task having one schedule stored in the storage when the type, the at least one of the date and the time, and the location that are included in the schedule information stored in the storage of each of the two or more scheduled tasks satisfy an integration condition indicative of improved efficiency of operation of the same flight vehicle when the two or more scheduled tasks are combined into the one integrated task; and
transmit the schedule information of the one integrated task to control the operation of the same flight vehicle; and
wherein the two or more scheduled tasks include a plurality of related tasks that use a same function of the same flight vehicle, and
wherein the integration condition includes a first condition relating to the type, a second condition relating to the at least one of the date and the time, and a third condition relating to the location, and
if the plurality of related tasks satisfy the first condition and the second condition but do not satisfy the third condition, the processor is configured to change the at least one of the date and the time of at least one of the plurality of related tasks such that the plurality of related tasks are performed continuously.

12. The management system according to claim 11, wherein
the integration condition is a condition that the type of the two or more scheduled tasks are the same, a difference between the at least one of the date and the time of the two or more scheduled tasks falls within a predetermined time range, and a distance between the location at which the two or more scheduled tasks are to be performed falls within a predetermined distance range.

13. The management system according to claim 11, further comprising:
a terminal apparatus operated by a manager of a task of the same flight vehicle; and
wherein the processor is further configured to:
if the type, the at least one of the date and the time, and the location satisfy the integration condition, transmit information inquiring as to whether or not a schedule of at least one task of the two or more scheduled tasks may be changed, to the terminal apparatus operated by the manager of the at least one task; and
when response information indicating that the schedule of the at least one task may be changed is input, integrate each schedule of the two or more scheduled tasks.

14. The management system according to claim 13, wherein the processor is configured to:
transmit, to the terminal apparatus, benefit information indicating a benefit to be granted when the schedule of the at least one task is changed, and
when each schedule of the two or more scheduled tasks is integrated according to the input of the response information, grant the benefit to the manager.

15. The management system according to claim 11, wherein the processor is further configured to:
acquire weather information; and
change a schedule of at least one of the two or more scheduled tasks based on the acquired weather information.

16. The management system according to claim 11, wherein
the storage stores proficiency levels of a plurality of operators who are to operate the same flight vehicle in the two or more scheduled tasks, and
based on the proficiency levels stored in the storage, the processor is further configured to change an operator who is to operate the same flight vehicle in at least one of the two or more scheduled tasks.

17. The management system according to claim 11, wherein the processor is further configured to change the at least one of the date and the time of one of the two or more scheduled tasks to the at least one of the date and the time of one of a second of the two or more scheduled tasks.

18. The management system according to claim 11, wherein each of the two or more scheduled tasks relate to agriculture.

* * * * *